C. F. MONTAG.
ORTHODONTIA APPARATUS.
APPLICATION FILED APR. 27, 1910.
986,076.
Patented Mar. 7, 1911.
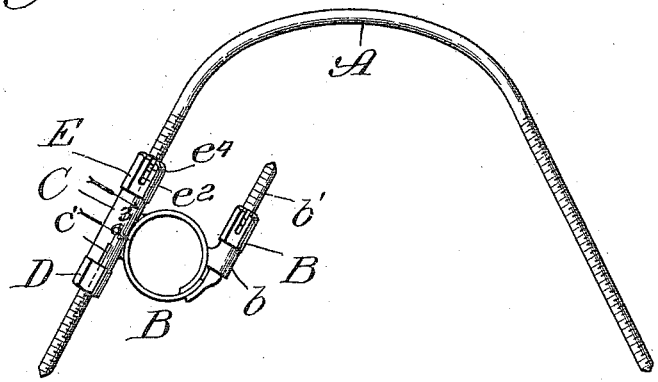
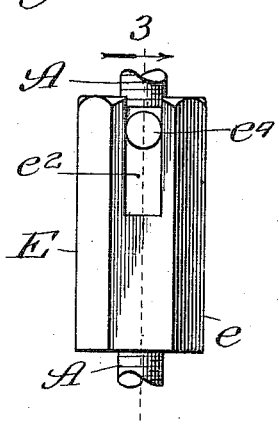
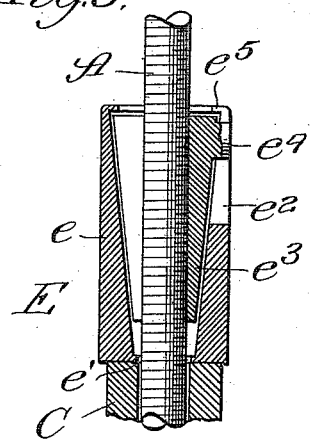
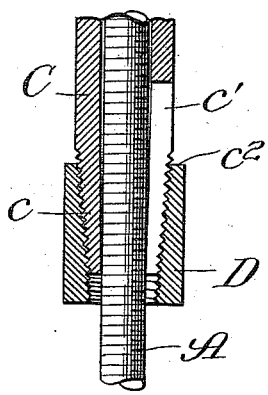
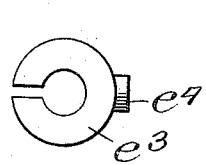
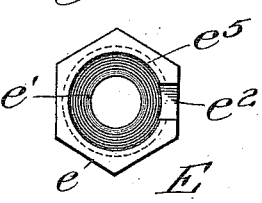
Witnesses:
Inventor:
Christoph Friedrich Montag,
By Dyrenforth, Lee, Chritton & Wiles.
Att'ys

UNITED STATES PATENT OFFICE.

CHRISTOPH FRIEDRICH MONTAG, OF BLUE ISLAND, ILLINOIS.

ORTHODONTIA APPARATUS.

986,076.  Specification of Letters Patent.  Patented Mar. 7, 1911.

Application filed April 27, 1910. Serial No. 557,888.

*To all whom it may concern:*

Be it known that I, CHRISTOPH FRIEDRICH MONTAG, a citizen of the United States, residing at 284 Western avenue, Blue Island, in the county of Cook and State of Illinois, have invented new and useful Improvements in Orthodontia Apparatus, of which the following is a specification.

My invention relates to certain new and useful improvements in orthodontia appliance, and is fully described and explained in the specification and shown in the accompanying drawing, in which:

Figure 1 is an elevation of the appliance, the anchor-band being removed from one end of the arch-band; Fig. 2 is an enlarged elevation of one of the nuts used, the same being shown in position upon a portion of the arch-band; Fig. 3 is a section on the line 3 of Fig. 2; Fig. 4 is an end-view of the inner member of the nut; Fig. 5 is an end-view of the completed nut, and Fig. 6 is a section on the line 6 of Fig. 1.

Referring to the drawings A is a threaded arch-band which may be of any usual form.

B is an anchor-band, the ends of which are overlapped in the usual manner, one of the ends carrying an eye $b$ and the other a screw $b^1$ upon which is a clamping-nut $B^1$ whereby the anchor-band is secured to the anchor-tooth in the usual manner. The clamping nut $B^1$ is of the form presently to be described as used for adjusting purposes. The anchor-band carries a buccal tube C, which is tapered off at its rear end at $c$, provided with a slot $c^1$ and with screw-threads $c^2$ at its tapered rear-end upon which screw-threads a nut D is placed.

E is, in a general way, the adjusting nut which is threaded upon the arch-band A in the usual way. The details of construction of this nut is shown in Figs. 2, 3, 4 and 5, and will now be described; $e$ is the outer member of the nut, the same being of the usual hexagonal form on its outside, so as to be grasped by a suitable wrench. The outer member $e$ is perforated by a conical opening, the larger end of which is away from the buccal tube, or other part with which the nut coöperates. The small end of the conical bore terminates in a shoulder $e^1$. The rear-end of the outer member of the nut $e$ is slotted at $e^2$. Within the outer member is an inner member $e^3$ which is conical in form and is threaded to embrace the arch-band A. This inner or conical member has an ear $e^4$ which runs in the slot $e^2$ so that the inner or conical member $e^3$ cannot rotate with respect to the outer member of the nut but it is free to move longitudinally therein. After the inner or conical member is placed in the nut, the upper end of the nut is spun or otherwise shaped to place a shoulder to the rear of the inner or conical member for the purpose of providing its backward movement and the shoulder $e^1$ previously referred to limits its forward or inner movement. The inner or conical member $e^3$ of the nut is slotted as illustrated in the drawings so that it can be compressed upon the anchor-band in the manner and for the purpose hereinafter described.

The present device possesses two highly desirable features. In the first place, the buccal tube can, by means of a nut D, be tightly clamped upon the arch-band so as to maintain any desired position with reference thereto. It has been found most desirable in the past to be able to fix and maintain a definite angular relation between the arch-band and the anchor-band so that when the relation between the plane of the arch-band and the plane of the anchor-band is once determined it will remain fixed. In this way pressure exerted upon the anchor-tooth will not tend to tip the tooth outward. It will readily be seen that with the usual arrangement any outer pressure of the rear-ends of the arch-band will tend to tip the anchor-teeth over, so that their axes will flare outward. In some cases however it is desirable to have a certain amount of tilting of the anchor-teeth, and to be able to regulate and control that tilting so long as it is desired and then to stop it absolutely. Devices have been proposed where, through the medium of a squared guide or the like upon the arch-band all movement is prevented, but the present device affords means whereby without any alteration or change whatever the two parts in question can be permitted to turn easily, or against a slight or great friction or can, if desired, be locked in an absolutely rigid relation. This feature gives great flexibility to the appliance. Furthermore, in the past great difficulty has been experienced, arising from the fact that when the appliance is set in one given position to move the teeth, the teeth will move quite quickly to the limit of elasticity of the arch-band and the parts will then be loose so that the tongue and cheeks of the wearer of the appliance may loosen up the nuts which exert pressure upon the arch-band, permitting the arch-band to move back to its original position. It requires but a slight amount of friction to prevent this loosening by the tongue and cheeks of the wearer of the appliance, but there is not sufficient friction between the end of the buccal tube and the nut after the teeth have moved to the limit to which they can readily be moved. Various devices have been proposed for preventing this action, but they have all required some peculiar configuration of the buccal tube, so that the whole appliance had to be specially made, a buccal tube of ordinary and common form being wholly inapplicable to these devices. The present nut however, is so arranged that when pressed against the end of a buccal tube in the usual way, the outer member of the nut will be pushed backward, crowding the inner member into firm frictional contact with the arch-band, to such an extent that the tongue and cheeks of the wearer have no appreciable effect of loosening the nut. The nut is of ordinary size and cut with threads of the ordinary number and shape, and it will be obvious that it can be used upon any orthodontia appliance whatever and will coöperate with any ordinary buccal tube. It has been found too, by actual experience, that the nut never sets too tight to be quite readily loosened with a wrench such as is ordinarily used in orthodontia work, nor do the two members of the nut work so closely together that they cannot be readily moved longitudinally at all times, by the application of a very slight pressure, upon which the nut will of course turn quite easily.

I realize that considerable variation is possible in the details of construction of my improved device, without departing from the spirit of my invention, and I do not intend, therefore, to limit myself to the specific form herein shown and described.

What I claim as new and desire to secure by Letters Patent, is:

1. The combination with an anchor-band, and a threaded tension member, of a sleeve movable on the tension member and a nut comprising two members, the outer of which has a flaring opening and the inner of which fits non-rotatably within the opening, is threaded to engage the tension member and split to be clamped on the tension member.

2. The combination with an anchor-band, and a threaded tension member of a sleeve movable on the tension member and a nut comprising two parts, the outer of which has a flaring opening, the inner of which fits within the opening, is threaded to engage the tension member, is split to be clamped on the tension member and is provided with an ear running in a slot in the outer member to prevent relative rotation of said parts.

3. The combination with an anchor-band, and a threaded tension member of a sleeve movable on the tension member and a nut comprising two parts, the outer of which has a flaring opening, the inner of which fits within the opening, is threaded to engage the tension member, is split to be clamped on the tension member and is provided with an ear running in a slot in the outer member to prevent relative rotation of said parts, the metal of the outer part being spun over the inner part to prevent the removal thereof.

4. The combination with an anchor-band and a sleeve cone-shaped and split at one end attached thereto of a tension member running through the sleeve an adjusting nut on the tension member and a second nut threaded on the cone-shaped split part of the sleeve to contract the same upon the tension member.

5. The combination with an anchor-band and a split sleeve attached thereto of a tension member extending through the sleeve an adjusting nut on the tension member and a second nut threaded upon the split sleeve to contract the same.

In testimony whereof, I have hereunto set my hand.

CHRISTOPH FRIEDRICH MONTAG.

In presence of—
  J. G. ANDERSON,
  R. A. SCHAEFER.

---

Copies of this patent may be obtained for five cents each, by addressing the "Commissioner of Patents, Washington, D. C."